United States Patent [19]

Krettenauer et al.

[11] Patent Number: 4,639,008
[45] Date of Patent: Jan. 27, 1987

[54] SELF-PROPELLING VEHICLE WITH TWO AXLE UNITS CANTILEVERED TOGETHER

[75] Inventors: Gustav Krettenauer, Gaggenau; Heinz Kiwitz, Stuttgart, both of Fed. Rep. of Germany

[73] Assignee: Daimler-Benz Aktiengesellschaft, Stuttgart, Fed. Rep. of Germany

[21] Appl. No.: 568,391

[22] Filed: Jan. 5, 1984

[30] Foreign Application Priority Data

Jan. 7, 1983 [DE] Fed. Rep. of Germany ....... 3300335

[51] Int. Cl.$^4$ .............................................. B62D 49/06
[52] U.S. Cl. .............................. 280/405 R; 172/247; 172/253; 172/292; 280/461 A
[58] Field of Search .......... 280/405 R, 405 A, 405 B, 280/406 R, 407, 446 R, 446 A, 456 R, 456 A, 460 R, 460 A, 461 R, 461 A, 462, 463, 467, 468, 482, 483, 488, 489, 490 R, 491 R, 491 A, 725, 702, 716, 713; 172/292, 247

[56] References Cited

U.S. PATENT DOCUMENTS

| 3,299,547 | 1/1967 | Gee et al. ........................ 280/405 R |
| 3,643,976 | 2/1972 | Haupt et al. ................. 280/460 A X |
| 4,314,709 | 2/1982 | Silbernagel .................. 280/405 R X |
| 4,418,935 | 12/1983 | O'Connor ....................... 280/461 A |

FOREIGN PATENT DOCUMENTS

| 186038 | 6/1956 | Austria ............................ 280/490 A |
| 343561 | 11/1921 | Fed. Rep. of Germany ... 280/405 R |
| 611134 | 3/1935 | Fed. Rep. of Germany ... 280/405 R |
| 487895 | 6/1938 | United Kingdom ............ 280/405 R |
| 2133754 | 8/1984 | United Kingdom ............ 280/405 R |

Primary Examiner—John J. Love
Assistant Examiner—Mitchell J. Hill
Attorney, Agent, or Firm—Barnes & Thornburg

[57] ABSTRACT

A self-propelling commercial vehicle, especially a tractor-like agricultural vehicle, with two units each having an unsprung axle, of which the first unit, as drive unit, includes a drive aggregate and a driver place located within the area of its end coordinated to the second unit, and of which the second unit is guided by way of a cantilever which is connected with the first unit to be pivotal in the vertical direction and is elastically supported with respect thereto; the cantilever is additionally pivotal in the vertical direction with respect to the axle of the second unit while a guide support is provided for the rectilinear guidance of this axle which is offset in the vertical direction to the centilever and is detachable and pivotal with respect to the axle and the drive unit of the first.

22 Claims, 8 Drawing Figures

SELF-PROPELLING VEHICLE WITH TWO AXLE UNITS CANTILEVERED TOGETHER

The present invention relates to a self-propelled commercial vehicle, especially to an agricultural commercial vehicle such as a tractor, with two units each including an unsprung axle. The one unit constituting the first and driving unit carries a drive aggregate and a driver place within the area of its end coordinated to the second unit. The second unit includes an overhang beam or cantilever which, starting from the drive axle associated therewith, is pivotally connected in the vertical direction with the first unit and is springily supported with respect thereto.

Self-propelled commercial vehicles, especially tractor-like commercial vehicles, are conceived as multi-purpose vehicles and must be used as towing machines (tractors) as well as for transporting and carrying purposes, especially as carrying vehicles for work tools. A host of very different requirements result therefrom whereby, as examples for extreme loads, mention should be made of the use of such vehicles during plowing and during loading by means of a front-loader. The different operating or service uses require very different driving velocities; thus, for example, for planting operations, very low velocities of 1 km/h and less and for transporting operations velocities of 30 km/h and more. With all of these operational uses, the greatest comfort, should be provided for the tractor operator or driver since tractor driving is an all-day occupation in the modern operational use in conjunction with the individual operations that can be carried out with the aid of the tractor. The mentioned comfort requires spring conditions which should be as good as possible. A spring support of all axles would, from that point of view, be therefore desirable and is also partially undertaken. However, the spring support of all axles entails uncontrollable disadvantages for individual operating uses such as, for example, in particular for plowing, whence a large number of the afore-mentioned vehicles are spring-supported exclusively with respect to the front axle wherein the spring support takes place exclusively by way of the tires at the rear axle. If the vehicle is operated in alternating driving directions for the individual operations, difficulties result also from this point of view if only one axle is spring-supported. It is known in the prior art to leave the front and rear axles unsprung. This entails considerable comfort losses, but is appropriate with respect to the use in many operations, especially in connection with heavy operations such as plowing.

From all of the foregoing it follows that in view of the multiple use necessities and requirements, tractors must be constructed as true multi-purpose vehicles and therefore have been affected with corresponding compromises with respect to their design conception.

This is also true for self-propelling commercial vehicles which are used as articulated commercial vehicles, especially as building site vehicles. Normally these vehicles are as a rule four-wheel-drive vehicles and include a front unit and rear unit, with one driving axle each rigidly connected with the frame. The pivoting connection between the two units about a vertical axis disposed approximately in the vehicle center thereby serves for steering purposes. Additionally, a pivotability of the two units with respect to one another about a vehicle longitudinal axis is thereby also provided. Such types of vehicles have not been successful in the agricultural field. They are unsprung and uncomfortable for the driver, notwithstanding tires of large dimensions with correspondingly high tire spring capacities.

Furthermore, self-propelling commercial vehicles are known in the prior art which are composed of two units with one unsprung axle each. The springing action is achieved in that these two units are mutually pivotal about a vehicle cross-axis (British Pat. No. 887,611). Such vehicles, however, are not suited for the agricultural multi-purpose operation because: (1) such vehicles must be provided preferably in the rear area with pivotal connections for attachments and implements and; (2) for many attachments and implements of this type the requirement exists that they assume as uniform as possible a position with respect to the ground. This, is almost impossible if the pivot point about a vehicle cross-axis is located during spring movements, relatively far from the areas in which the attachments and implements can be pivotally connected.

The present invention is concerned with the task to so construct vehicles of this type that they possess good prerequisites with respect to the mounting of attachments and implements while maintaining comfort and which are suitable for the plowing operation and can also be used in a versatile manner.

The underlying problems are solved according to the present invention in that the second unit is guided by way of an overhang beam or cantilever which is additionally pivotal in the vertical direction with respect to the associated driving axle. For rectilinear guidance of this axle, a guide support is provided which is offset in the vertical direction with respect to the cantilever overhang beam, is detachable and is pivotal with respect to the associated axle and the drive unit. Significant for the present invention is the rectilinear guidance of the axle. The the term rectilinear guidance is to be understood to mean that a vertical vehicle transverse plane, given in the normal position and containing the wheel centers of this axle, essentially maintains its vertical position in all spring positions, irrespective of certain displacements in the vehicle longitudinal direction. Starting from this basic construction, and owing to the fact that the guide member support is detachable, the possibility exists, during plowing operations, that support forces on the tractor lead exclusively to an axle load increase for the axle associated with the second unit with no concomitant torques on the vehicle as a whole, which would effect a relieving or unloading of the axle belonging to the driving unit. As a result thereof, the constructively predetermined load conditions for the axles, especially for four-wheel-drive vehicles, remain in the plowing operation if the plow receives a corresponding additional support within the area of a rear end.

The vehicle concept according to the present invention additionally enables in a simple manner the separate use of both units of the vehicle. For example, the use of the driving unit as pushing or towing unit. In this connection, it may be particularly appropriate to render the driver's cab location pivotal through 180° in a conventional manner.

The aforementioned considerations have demonstrated that the basic concept of the present invention opens up a vast array of use possibilities, independently of the manner in which the two units are pivotally and spring supported with respect to one another.

Thus, within the scope of the present invention, the pivotal support may take place in such a manner that an ideal pivot axis or a less than ideal pivot axis is realized. It has been found to be particularly advantageous if the pivotal connection of these two units which determines the transverse axis, takes place by way of a bodily fixed pivot axis.

Furthermore, within the scope of the present invention, the connection of the two units may take place, on the one hand, by way of a central connection disposed within the area of the vehicle longitudinal center axis. Another possibility according to the present invention resides in connecting the two units to one another by way of two connections disposed symmetrically to the vehicle center longitudinal axis.

In principle, it is appropriate if the sprung connection of the two units, includes an overhang beam or cantilever pointing in the vehicle longitudinal direction and pivotally mounted and spring supported with respect to a unit. The cantilever or overhang beam may thereby preferably form a connecting element independently of the two units or may also be a component of one unit. With a view to the elastic or spring connection by way of the cantilever or overhang beam, it is appropriate if the latter is spring or elastically retained about a center position and is springily supported in the direction toward its center position.

With a view toward this purpose, there is an advantage if the one unit includes at one end a receiving means on the frame side for the cantilever overhang beam in which the cantilever or overhang beam is supported, since the springy support can thus be realized without large additional expenditures and practically all known spring types can be used for the spring support.

A particularly appropriate construction in conjunction with a receiving means on the frame side resides in that the cantilever or overhang beam is disposed with its free end engaging into the frame between two spring elements, whereby actively controlled or passive springs may be used for such spring elements. Especially in conjunction with actively controlled spring elements, an adaptation to the numerous use purposes of the vehicle can be attained by shifting or preprogramming spring behavior.

In view of the cantilever or overhang beam, the spring elements are arranged preferably transversely to the longitudinal direction thereof. The spring elements may be arranged on one side or on both sides of the pivot axis. Thus, it is possible, for example, to act upon the cantilever or overhang beam on both sides of the pivot axis by means of a spring element extending bridge-like over the pivot axis. It is thereby also possible with this spring arrangement or with other spring arrangements to vary the spring characteristics by longitudinal displacement of the spring with respect to the cantilever or overhang beam, if the spring itself is not changeable in its characteristics.

Within the frame of the present invention, the spring elements may also be arranged acting in the longitudinal direction of the cantilever or overhang beam if the cantilever or overhang beam is provided with at least one abutment for spring elements acting in its longitudinal direction.

It is additionally also possible within the scope of the present invention to combine the pivot axis and spring elements such that the spring element is constructed as pivot axis utilizing a torsion rod as is known with longitudinal guide links for passenger motor vehicles.

With such a construction a torsion rod may be provided for two cantilevers or overhang beams or a torsion rod may also be coordinated to each cantilever or overhang beam, whereby greater lengths can be realized for the torsion rods. In one embodiment of the present invention the spring elements, similar to the construction of U-shaped stabilizers, may be connected in one piece with the torsion rod. Thus, additional twistability of the torsion rod may be possible as pivot axis and the torsion rod, in its turn, can then be spring-supported in a center position whereby a great range of variation as regards spring behavior can be realized.

According to another feature of the present invention damping elements may be coordinated to spring elements or damping elements may be integrated into the spring elements, which is possible in a simple manner especially in conjunction with pneumatic springs into which the damping functions are integrated. Pneumatic spring elements of this type are known as such in the prior art.

According to another feature of the present invention it is additionally appropriates if the cantilever overhang beam is limited in its pivotal travel by way of fixed or adjustable abutments to permit the adjustment of different limit values up to complete blocking of the spring system.

With a view toward the twisting ability of the axles with respect to one another about a vehicle longitudinal axis, i.e. the twistability of the drive axles, it is thereby of advantage if the cantilevers or overhang beam consist of two parts mutually rotatable about their longitudinal axis. It would also be possible according to the present invention to create a jointed or articulated connection of the cantilever or overhang beam to the drive axle and/or to the pivot axis. The first-mentioned possibility could be realized in a particularly simple manner in that the cantilevers or overhang beams consist of two mutually rotatable pipe sections. Such an arrangement in accordance with the present invention would additionally offer the advantage that the cantilever or overhang beam would be longitudinal adjustable in a simple manner, i.e. telescopic. Such a longitudinal adjustability would enable additional possibilities for the different use purposes by changing the distance of the drive axles with respect to one another. Advantages which result therefrom, would reside in particular in the adaptation to different use purposes and could also be seen in that possibly a loading platform could be mounted.

A length adjustability would also be appropriate within the scope of the present invention for the upper control or guide arm or arms of the guide support.

With a view toward constructions in which the drive unit carries all elements for the connection of a second unit, it is appropriate if the cantilever or overhang beam and guide members of the guide link support are connected with each other in a joint-like manner by way of a coupler. Such a simple connection coupling can be formed, for example, by a female part at the guide member.

The female coupling part may then receive, for example, a central frame bearer of a unit to be joined pivotally about the longitudinal axis so that the coupled unit could form an implement carrier.

Within the scope of the present invention the connection between cantilever(s) or overhang beam(s) and guide member(s) can also take place as coupler by way of a separate intermediate frame which may carry, for example, the female part.

The basic construction of the commercial vehicle according to the present invention is so constructed that the wheels of one or both axles can be made steerable and/or driven. Both drive axles can utilize variable wheel track adjustments. With the present invention it is possible to block the steerability of one or the other axle.

These and other objects, features and advantages of the present invention will become more apparent from the following description when taken in connection with the accompanying drawing which shows, for purposes of illustration only, several embodiments in accordance with the present invention and wherein.

Figure 1:
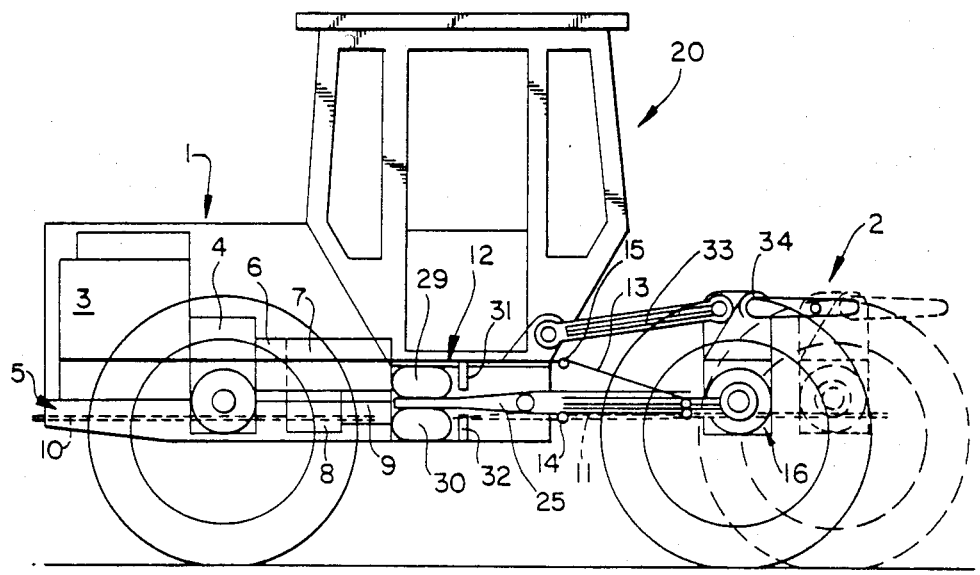
FIG. 1 is a schematic side elevational view, partly in cross section, of a tractor-like commercial vehicle according to the present invention, which consists of two units each having an axle, which are supported to be pivotal with respect to one another in the vertical direction about a cross axis disposed therebetween and which are springily supported with respect to one another.
Figure 5:
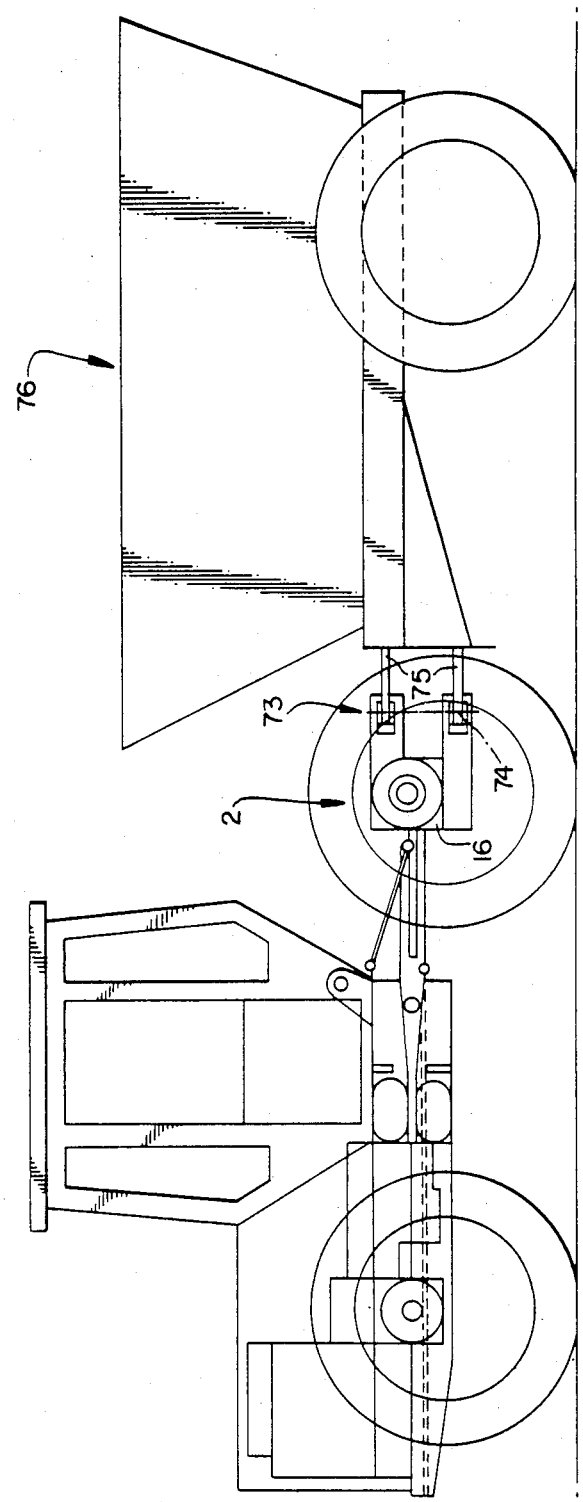
Figure 6:
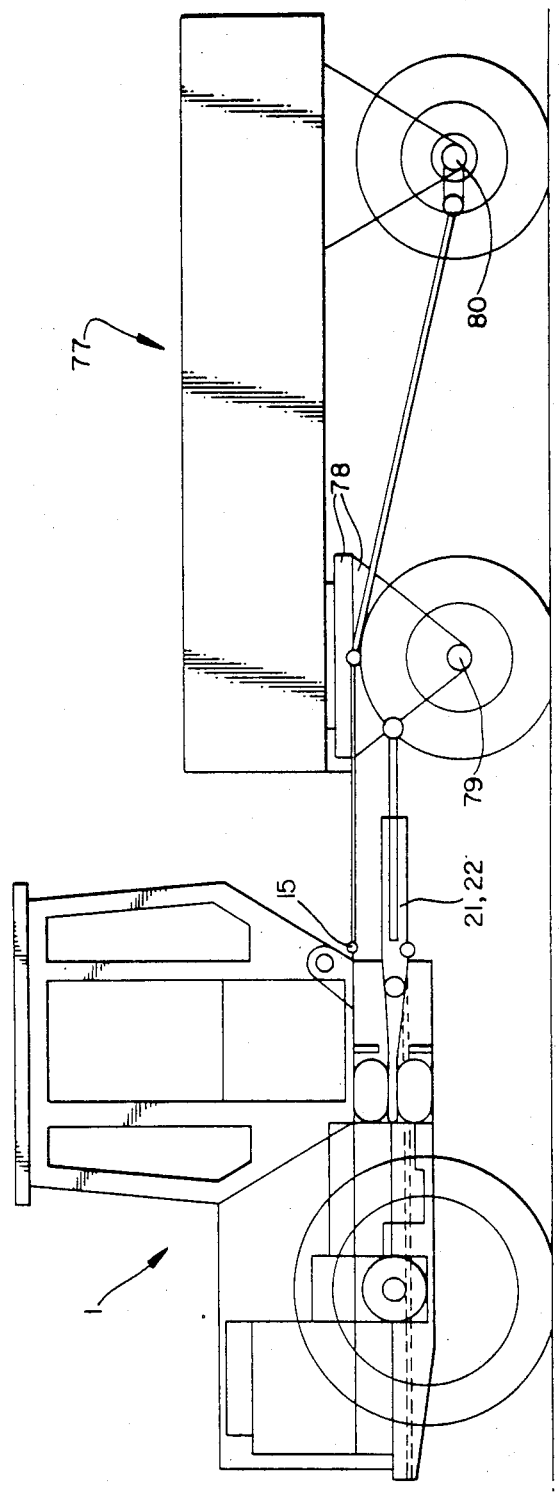

FIG. 5 is a schematic side view, similar to FIG. 1, of a still further modified embodiment of a commercial vehicle in accordance with the present invention, which includes a fifth-wheel trailer whereby the support load of the trailer is transmitted onto the driving axle of the connected second unit; and FIG. 6 is a schematic side elevational view, similar to FIG. 1, of still another embodiment of a commercial vehicle according to the present invention, whereby a multi-axle trailer is connected as second unit with the drive unit as first unit.

Figure 7:
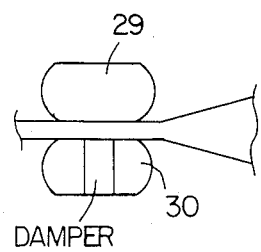

FIG. 7 is a schematic partial elevational view of a further modification of still another embodiment of the invention wherein a damper for the cantilever beam mechanism is utilized.

Figure 8:
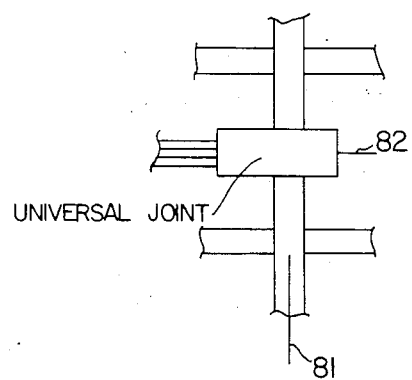

FIG. 8 shows a schematic partial plan view of a universal joint used to provide a cardinal connection between either the cantilever or guide mechanism and the second axle unit of the second unit shown in FIG. 1.

Figure 2:
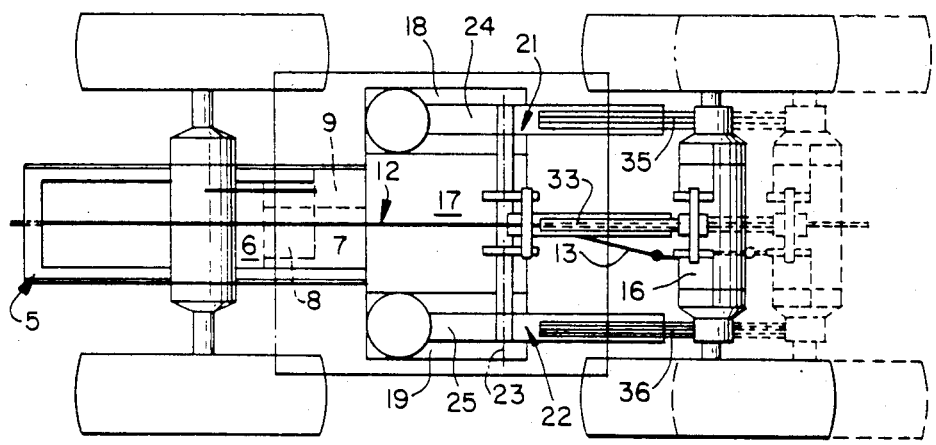
FIG. 2 is a plan view, partly in cross section, on the tractor-like vehicle shown in FIG. 1.

Referring now to the drawing wherein like reference numerals are used throughout the various views to designate like parts, and more particularly to FIGS. 1 and 2, a self-propelling tractor-like vehicle is illustrated in these Figures which consists of two units generally designated by reference numerals 1 and 2, of which the first unit 1 forms a driving unit and the second unit 2 forms a connected unit which is preferably interchangeable with other units of different types.

The illustrated vehicle is preferably equipped as tractor-like vehicle with connections for front and rear equipments and implements, which are not shown in detail herein, each as front and/or rear three-point pivotal connections which would be coordinated to the respective unit. Additionally, corresponding power take-off or auxiliary shaft connections are provided. In the illustrated embodiment, the unit 1 includes the engine 3, schematically illustrated and the axle housing 4 of the driving axle coordinated to the driving unit 1 and constructed a portal axle, which is rigidly connected with the frame 5 of the drive unit 1. The engine 3 is located ahead of the axle housing 4. The transmission unit which is arranged to the rear of the axle housing, includes a transfer box or input transmission 6, a main transmission 7, a power take-off or auxiliary drive 8 and a front axle drive 9. As shown in FIG. 1, adjoining the axle housing 4, an input transmission 6 is provided, and adjoining the same, the main transmission 7 is provided. The auxiliary or power take-off drive 8 and the front axle drive 9 are located essentially below the main transmission 7, whereby the power take-off drive 8 is provided essentially in the longitudinal center and below the main transmission 7 adjoining the input transmission 6, whereas the front axle drive 9 is arranged offset downwardly with respect to the main transmission 7 and laterally with respect to the auxiliary take-off drive 8, in the illustrated embodiment toward the right. The central location of the auxiliary take-off drive 8 below the main transmission 7 enables in conjunction with the construction of the drive axle as portal axle, a central continuous drive connection of the auxiliary or power take-off shaft 10 (FIG. 1) with front and rear connections (not shown). The position of the front axle drive 9 in the illustrated laterally offset arrangement makes it possible to extend the axle drive for the axle of the second unit centrally toward the rear, and more particularly above the power take-off shaft 10. It is possible thereby, as can be seen from a comparison of FIGS. 1 and 2, to use axles of essentially the same construction for both the front and the rear unit, and more particularly with an arrangement mutually offset by 180°. The power take-off shaft 10 is continued preferably to the end of the drive unit 1 and includes thereat a connecting joint for an extension 11 (FIG. 1). The drive connection from the crankshaft of the engine 3 by way of the main transmission 7 to the rear end of the drive unit 1 is generally designated by reference numeral 12 and terminates in a connecting joint, from which leads an extension 13 to the driving axle of the unit 2, which is preferably also constructed as portal axle. The aforementioned connecting joints are designated by reference numerals 14 and 15, and the connecting joint 15 in the drive connection to the axle of the second unit 2 or a connection (not shown) at the axle housing 16 of the drive axle of the second unit 2 form possible connecting places of an auxiliary drive or power take-off drive dependent on travel.

The frame 5 of the drive unit 1 is matched in its width to the engine-transmission unit and extends with correspondingly slight width over the entire length thereof, which in case of the steerability of the wheels of the driving axle of the drive unit 1 is required for the greatest possible steering deflection thereof. Within the area disposed therebehind, the frame 5 is constructed of greater width and includes a central area 17 (FIG. 2), which forms preferably the tank space of the drive unit 1. Pocket-like receiving and mounting means 18 and 19 are located on both sides of the central area 17 which in its width corresponds approximately to the width of the forwardly projecting frame area 5. The driver cabin generally designated by reference numeral 20 is arranged above the frame area which is formed by the tank space 17 and the receiving and mounting means 18 and 19 on both sides of the tank space 17. A rotatably seating and operating unit is arranged in the driver cabin 20 to assist in driving from both forward and rearward directions and which is of conventional construction and therefore not illustrated.

In the embodiment according to FIGS. 1 and 2, cantilevers or overhang beams 21 and 22 project into the mounting receiving means 18 and 19, by way of which the connection of the drive unit 1 with the compound unit 2 is established. The mounting and receiving means 18 and 19 are therefore open in the direction toward the second connected unit 2. The cantilevers or overhang beams 21 and 22 are pivotally supported with respect to the frame 5 by way of a pivotal support having a pivot axis 23 (FIG. 2) extending in the transverse direction within the area of the mounting and receiving means 18 and 19.

The cantilevers or overhang frames 21 and 22 form two-armed levers in relation to the pivot axis 23, whose lever arms 24 and 25 extending forwardly into the receiving means 18 and 19 are located between schematically illustrated spring elements. These spring elements are designated similarly for both cantilevers or overhang beams 21 and 22 and consist of an upper spring element 29 and of a lower spring element 30, between which is located the respective lever arm 24 or 25, and by means of which the respective lever arm is springily supported in relation to a center position. The maximum spring travel of each cantilever or overhung beam is limited by abutments 31 and 32 suitably located on the frame. The spring elements 29 and 30 can be matched to one another in relation to the respective load conditions in a manner not illustrated in detail herein. This is possible in a known manner in connection with pneumatic springs, for example, by a corresponding change of the pressure conditions. A corresponding matching would also be possible with a constant construction of the springs where the effective lever arm thereof is changed in relation to the pivot axis 23 by longitudinal adjustment of the springs along the cantilevers or overhang beams. A conventional pneumatic damper can be utilized with these springs such as shown in FIG. 8.

The cantilevers or overhang beams 21 and 22 form in the illustrated embodiment, the lower guide members of a guide linkage whose upper guide member forming a support is designated by reference numeral 33, and by way of which a rectilinear guidance for the axle housing 16 and therewith for the drive axle of the second connected unit 2 is realized. The guide linkage, formed by the cantilevers or overhang beams 21 and 22 as lower guide members and the upper guide member 33 can be formed as known three-point guide link arrangements or by multi-jointed guide linkages as parallelogram-like guide member connections.

The force lifter 34 with the associated force lifter arms is coordinated to the axle housing 16 of the second drive axle in a known manner (not illustrated).

In order to enable a twisting of the drive axles of the two units 1 and 2 with respect to one another, the cantilevers or overhang beams 21 and 22 as well as the guide member 33 are formed in two parts whereby their forward and rear parts are mutually pivotal about a longitudinal axis. The rear parts which are guided in the tubularly shaped forward parts of the centilevers or overhang beams 21 and 22 and thereby designated by reference numerals 35 and 36 (FIG. 2). The pivotability about the longitudinal axes and the telescopic construction chosen therefor makes it additionally possible in a simple manner to change the distance of the drive axle of the second connected unit 2 with respect to the drive unit 1. This selective adjustability, at will, of the drive axles (with the axle housings 14 and 16) of the units 1 and 2 with respect to one another is appropriate with a view toward a change of the axle loads; possibly also if the second connected unit 2 is to be used as carrying unit, for example for a loading platform.

Alternative to the pivotal connection of cantilevers 21, 22 and guide member 31 with the axle unit 16, a cardinal (universal joint) connection can be used to provide two right angled pivot axis connections 81 and 82.

Figure 3:
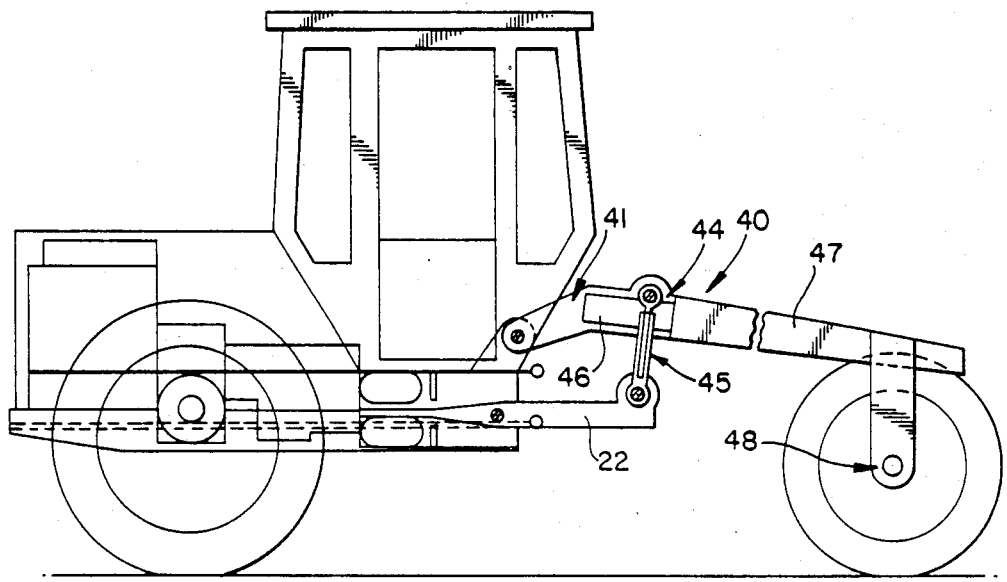
FIG. 3 is a schematic side elevational view of a modified embodiment of a commercial vehicle according to FIGS. 1 and 2, whereby the connected unit which forms a second unit with respect to the drive unit as first unit, is constructed in the manner of an implement carrying unit.
Figure 4:
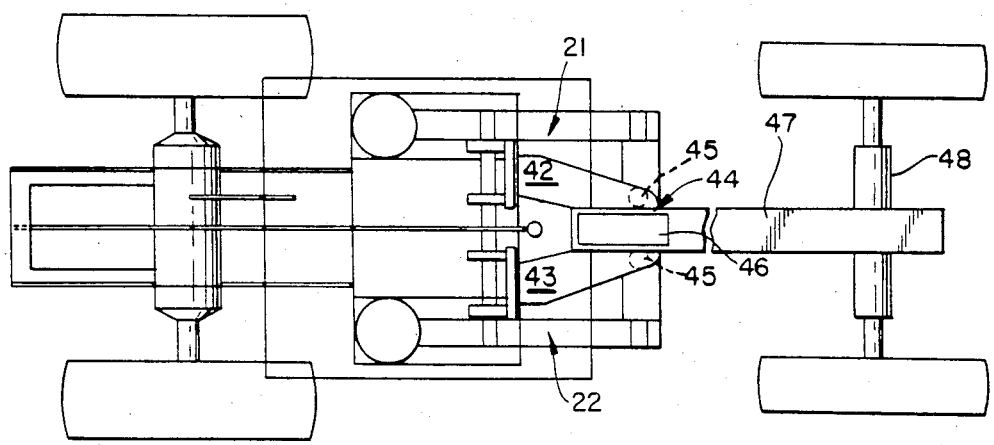
FIG. 4 is a plan view on the vehicle of FIG. 3, showing some additional details thereof.

FIGS. 3 and 4 illustrate a construction in which a drive unit according to FIGS. 1 and 2 is used in conjunction with a connected unit 40 as second unit, which leads to an overall vehicle in a manner of an equipment or implement carrier with central frame. Differing from the embodiment according to FIGS. 1 and 2, an upper guide member generally designated by reference numeral 41 is supported at the drive unit 1 by way of its forked arms 42 and 43 (FIG. 4), and the arms carry a coupling head 44. Within the area of the coupling head 44 the upper guide member 41 is pivotally connected with the ends of the cantilevers or overhang beams 21 and 22 by way of a coupler connection 45 whereby the coupler connection 45 is preferably adjustable in length so that the inclination of the cantilevers or overhang beams 21 and 22 to the direction of the opening of the female part of the coupling head 44 is changeable. The length adjustability of the coupler connection 45 enables, according to the present invention, the lowering of the drive unit 1 on support rollers or the like within the area of its end facing the adjoining unit. The coupling respectively separating operation of two units is facilitated thereby. The coupling head 44 is thereby constructed sleeve-like and rotatably receives a connecting member 46 of the central frame bearer 47 of the connected unit 2 to be rotatable about its longitudinal axis so that a twisting of the drive axles of the two units is possible with a drive axle 48 rigidly connected with the frame bearer 47 where equipment or implements connected with the frame bearer 47 of the connected unit are guided directly in dependence on the drive axle of this unit.

It is also schematically indicated by reference to FIGS. 3 and 4 that the construction according to the present invention of a commercial vehicle, especially in conjunction with the described frame construction makes possible the adjustment of different wheel tracks over a large range. The wheels of the two drive axles may thereby be steerable. Furthermore, the coupling head 44 may also be so constructed within the scope of the present invention that a pivoting about a vertical axis is possible in particular so that the tractor could be used as articulated tractor. If a particularly narrow wheel track is desired with respect to the drive axle of the driving unit, then the steering can take place also exclusively by way of the axle 48 of the attached unit whereby particularly large steering deflection angles can than be realized if the drive axle of this connection unit is a non-driven axle. The steering of the drive axle 48 can be assured, for example, on a hydraulic basis by known means.

In the embodiment according to FIGS. 3 and 4 the drive unit may also form a pushing unit and in that case the drive axle 48 of the connected or attached unit then forms the steerable front axle.

In the embodiment according to FIG. 5, the use of a commercial vehicle according to FIGS. 1 and 2 in conjunction with a trailer to be connected by a fifth-wheel connection is shown. A connecting coupling generally designated by reference numeral 73 is coordinated to the axle housing 16 of the connected unit 2 as indicated schematically, which includes two receiving means for connecting eyelets 75 of the trailer 76, which are fixed at the frame and are disposed one above the other in the vertical direction. Since only a pivoting about the vertical axis 74 exists, but no pivoting about a cross-axis, the drive axle of the second unit, together with the axle housing 16 forms practically a front axle for the trailer 76 which is loaded by way of the entire draw bar or A-bracket load of the single axle trailer. This is possible in that the drive axle of the second unit 2 together with the axle housing 16 is retained exclusively by way of the cantilevers or overhang beams which for that purpose are fixed in their length, and in that a rectilinear guidance for the drive axle of the second unit is dispensed with. This can be achieved in that in relation to the embodiment illustrated in FIG. 1, the upper guide member assumes a floating position, i.e., is free to change in length or, as in the case of FIG. 5, a guidance by way of the upper guide member is dispensed with altogether. The overall arrangement illustrated in FIG. 5 could thus be considered as a two-axle trailer, to which the drive unit is coordinated as pushing or pulling unit. A pivotal connection takes place according to FIG. 1 for the connection of the second drive unit with the first drive unit, except for rectilinear guidance by way of the upper guide member 33.

A construction according to FIG. 5 leads to the fact that maximum support loads become effective on the drive axle of the second drive unit without unloading or relieving the drive axle of the first unit, i.e., of the drive unit.

The present invention thus enables particularly favorable conditions of the load distribution, especially in commercial vehicles with four-wheel drive, if the drive axle of the second drive unit is constructed as driven axle and is loaded by the weight transmitted by the fifth wheel connection without the occurrence of an unloading of the drive axle of the first drive unit by reason of the dispensed-with guidance by way of the torque support. The unloading or relieving of the drive axle of the drive unit 1 can be precluded in this manner and in conjunction with the resistance-controlled plowing, if the support of the torque of the drive axle of the second unit takes place on a support running behind the plow and the plow is carried by the force lifter during the operation. The drive axle of the second unit and the force lifter linkage with the plow beam connected thereto and the support disposed behind the plow, together form a support roller and bridge element, below which the plow shares are located at bridge pillars between the drive axle and the support.

The possibility of use indicated in conjunction with FIG. 5 where the drive unit 1 is used exclusively as front unit for vehicles or the like, is illustrated by reference to FIG. 6. A two-axle vehicle 77 is connected in this case with the drive unit 1, whereby the connection is schematically illustrated in such a manner that the cantilevers or overhang beams 21 and 22 according to FIG. 5 are connected with a turntable or fifth-wheel 78 and wherein the front axle 79 of the vehicle is pivotally connected with the vehicle body. With this type of use, the drive of the rear axle 80 of the vehicle, can take place according to the present invention by way of the connecting joint 15.

Tractors constructed in accordance with the present invention enable at least with respect to attachments provided in the rear, the attachment advantages of tractors with axles fixed at the frame, without having to give up the requisite comfort for the driver. They enable therebeyond constructional variations within a wide scope, and more particularly, while maintaining all essential elements so that such tractor-like commercial vehicles can be used to the same extent as tractors and as implement carriers. Therebeyond, it is possible according to the present invention to use such commercial vehicles coupled with drivable trailers, drivable tools and drivable equipments and implements in such a manner that the support load additionally applied to one axle of the tractor-like commercial vehicle, brings about a relieving of the other axle of the commercial vehicle. Thus the advantages of the four-wheel drive can be used optimally with such types of commercial vehicles according to the present invention. Therebeyond, particularly good conditions exist for the four-wheel drive in commercial vehicles of the type according to the present invention because the drive axles are unsprung, and more particularly notwithstanding spring action for the driver cabin.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A self-propelling commercial vehicle, comprising two units each having and being supported by a single unsprung axle means, one of said units forming a drive unit and including a drive mechanism therefor and a driver place within an area of the one unit at an end adjacent to the other unit, and means including cantilever means for guiding the other unit, said cantilever means being pivotally connected with the one unit in the vertical direction about a horizontal axis and elastically supported with respect to said one unit, the cantilever means being additionally connected to and pivotal in the vertical direction with respect to a horizontal axis of the axle means of said other unit, and guide means for rectilinear guidance of said other unit, said guide means being connected to both units and disposed offset in the vertical direction to the cantilever means, being detachable to and vertically pivotal about horizontal axes with respect to both the axle means of the other unit and to the drive unit, wherein the connection between the drive and other unit by the cantilever and guide means does not permit unloading of the axle means of the one unit by increased changes in loading on the second unit when the guide means is detached.

2. A commercial vehicle according to claim 1, wherein the vehicle is a tractor-like agricultural vehicle.

3. A commercial vehicle according to claim 1, wherein the drive unit includes at its one end receiving means for the cantilever means, the cantilever means being supported in said receiving means.

4. A commercial vehicle according to claim 3, with a frame means for the first unit, wherein the receiving means is provided on a side of the frame means of the first unit.

5. A commercial vehicle according to claim 4, wherein said cantilever means is constructed as one-armed lever means guided at the drive unit by way of a pivot shaft.

6. A commercial vehicle according to claim 4, wherein the cantilever means is constructed as two-armed lever means guided at the drive unit by way of a pivot shaft.

7. A commercial vehicle according to claim 4, wherein pneumatic spring means are provided for the elastic support of the cantilever means.

8. A commercial vehicle according to claim 7, wherein damper elements are coordinated to the spring means.

9. A commercial vehicle according to claim 8, wherein said cantilever means is constructed as one-armed lever means guided at the drive unit by way of a pivot shaft.

10. A commercial vehicle according to claim 8, wherein the cantilever means is constructed as two-armed lever means guided at the drive unit by way of a pivot shaft.

11. A commercial vehicle according to claim 3, wherein spring means are arranged in the receiving means.

12. A commercial vehicle according to claim 1, wherein the cantilever means is limited in its pivot movement by abutment means.

13. A commercial vehicle according to claim 12, wherein the drive unit includes at its one end receiving means for the cantilever means, the cantilever means being supported in said receiving means.

14. A commercial vehicle according to claim 13, wherein the abutment means are provided in the receiving means.

15. A commercial vehicle according to claim 1, wherein at least one of cantilever and guide means is cardanically connected with one of the two units.

16. A commercial vehicle according to claim 1, wherein at least one of cantilever and guide means is pivotal in relation to the longitudinal axis thereof.

17. A commercial vehicle according to claim 1, wherein each of the cantilever means and guide means include at least two cooperating elements, with one element of each of the at least two cooperating elements being mutually rotatable about a longitudinal axis of the vehicle.

18. A commercial vehicle according to claim 1, wherein at least one of cantilever and guide means is adjustable in length.

19. A commercial vehicle according to claim 1, wherein the cantilever means and guide means are connected by way of a coupler means and carry a connecting coupling.

20. A commercial vehicle according to claim 19, wherein the connecting coupling is formed by a central connecting pin.

21. A commercial vehicle according to claim 20, wherein the connecting pin is a component of a central tubular frame member.

22. A commercial vehicle according to claim 21, wherein the connecting coupling forms a rotatable mounting means for the connecting pin.

* * * * *